United States Patent
Wolfe (10) Patent No.: US 11,130,297 B2
(45) Date of Patent: Sep. 28, 2021

(54) WALL AND CEILING REPAIR PRODUCTS AND METHODS

(71) Applicant: Ronald J. Wolfe, St. Paul, MN (US)

(72) Inventor: Ronald J. Wolfe, St. Paul, MN (US)

( * ) Notice: Subject to any disclaimer, the term of this patent is extended or adjusted under 35 U.S.C. 154(b) by 102 days.

(21) Appl. No.: 16/229,064

(22) Filed: Dec. 21, 2018

(65) Prior Publication Data

US 2019/0193348 A1 Jun. 27, 2019

Related U.S. Application Data

(60) Provisional application No. 62/608,608, filed on Dec. 21, 2017.

(51) Int. Cl.
| | |
|---|---|
| *B29C 73/10* | (2006.01) |
| *C09J 7/20* | (2018.01) |
| *C09J 7/38* | (2018.01) |
| *E04G 23/02* | (2006.01) |
| *B29L 31/00* | (2006.01) |

(52) U.S. Cl.
CPC ............... *B29C 73/10* (2013.01); *C09J 7/20* (2018.01); *E04G 23/0214* (2013.01); *B29L 2031/776* (2013.01); *C09J 7/38* (2018.01); *C09J 2203/334* (2013.01); *C09J 2301/12* (2020.08); *C09J 2301/16* (2020.08); *C09J 2301/204* (2020.08)

(58) Field of Classification Search
CPC . C09J 7/38; C09J 7/20; C09J 2203/334; C09J 2301/10; C09J 2301/122; C09J 2301/204
USPC ....................................................... 156/71
See application file for complete search history.

(56) References Cited

U.S. PATENT DOCUMENTS

| | | | | |
|---|---|---|---|---|
| 1,928,838 | A * | 10/1933 | Marcus ................ | A41D 27/245 2/236 |
| 2,387,593 | A * | 10/1945 | Lesser ................... | A61F 13/023 428/190 |
| 2,833,327 | A * | 5/1958 | Boyce ..................... | B29C 73/10 152/367 |
| 3,044,524 | A * | 7/1962 | Werner .................. | B29C 73/10 152/367 |
| 3,455,077 | A * | 7/1969 | Long ..................... | E04B 1/6809 52/459 |
| 3,730,247 | A * | 5/1973 | White .................... | B29C 73/10 152/367 |
| 4,135,017 | A * | 1/1979 | Hoffmann, Sr. ........ | B29C 73/00 156/94 |

(Continued)

OTHER PUBLICATIONS

Self-Adhesive Stress Crack Tape Textured Roll, Amazon, Inc. web page, 8 pages (Dec. 13, 2018).

(Continued)

*Primary Examiner* — Alex B Efta
(74) *Attorney, Agent, or Firm* — Patterson Thuente Pedersen, P.A.

(57) ABSTRACT

A patch system and methods for using a patch system are described herein. The patch system has an elastomeric central portion configured to expand and contract over the types of distances commonly found in homes and other buildings that can result in opening and closing cracks in walls, for example. By applying the patch system across a crack under pre-tensioned conditions, opening and closing of the crack will not cause a visible defect in the wall or other surface.

18 Claims, 7 Drawing Sheets

(56) References Cited

U.S. PATENT DOCUMENTS

| | | | | |
|---|---|---|---|---|
| 5,078,828 A * | 1/1992 | Marglin | G03D 15/043 | 156/304.1 |
| 5,211,784 A * | 5/1993 | Haibach | B32B 27/12 | 156/152 |
| 5,464,692 A * | 11/1995 | Huber | C09J 7/245 | 428/343 |
| 5,593,756 A * | 1/1997 | Miller | H02G 3/266 | 428/194 |
| 5,614,284 A * | 3/1997 | Kranzler | B32B 7/12 | 428/138 |
| 5,620,768 A * | 4/1997 | Hoffmann, Sr. | B29C 73/10 | 428/77 |
| 5,654,063 A * | 8/1997 | Kirk | A62C 2/065 | 428/319.1 |
| 5,820,958 A * | 10/1998 | Swallow | C09J 7/22 | 428/42.2 |
| 6,912,798 B2 * | 7/2005 | Blau | C09J 7/38 | 33/758 |
| 7,971,405 B2 * | 7/2011 | Hansen | E04F 13/04 | 52/514 |
| 8,511,029 B2 * | 8/2013 | Hansen | E04G 23/0203 | 52/514 |
| 2009/0220726 A1 * | 9/2009 | Liggett | C09J 7/29 | 428/77 |
| 2011/0048513 A1 * | 3/2011 | Booth | C09J 123/20 | 136/252 |
| 2011/0203694 A1 * | 8/2011 | Brooks | F16L 55/1686 | 138/99 |
| 2014/0150913 A1 * | 6/2014 | Baker | F16L 55/17 | 138/98 |
| 2014/0238579 A1 * | 8/2014 | Dan-Jumbo | B29C 73/10 | 156/94 |
| 2016/0046088 A1 * | 2/2016 | Haag | B05D 7/50 | 427/535 |
| 2018/0023297 A1 * | 1/2018 | Dawood | B23P 6/04 | 29/402.09 |
| 2018/0230335 A1 * | 8/2018 | Mayo | E04F 13/042 | |
| 2019/0016107 A1 * | 1/2019 | Bertrand | B32B 37/12 | |
| 2019/0152003 A1 * | 5/2019 | Gungel | F16L 55/1683 | |
| 2019/0193348 A1 * | 6/2019 | Wolfe | B29C 73/10 | |
| 2020/0164599 A1 * | 5/2020 | Swift | B29C 66/01 | |

OTHER PUBLICATIONS

KRACK KOTE® Abatron, Inc, Aamzon, Inc. web page, 6 pages (Dec. 20, 2018).

* cited by examiner

WALL AND CEILING REPAIR PRODUCTS AND METHODS

TECHNICAL FIELD

Embodiments described herein relate to wall patches and methods for repairing cracks in sheetrock, wallboard, plaster, or other wall or ceiling surfaces.

BACKGROUND

Sheetrock, plaster, wallboard, and other materials are commonly used in construction for buildings and other structures. Most of the time, a finished wall or ceiling will be substantially flat. To make the finished surface flat, a variety of techniques can be used.

Sheetrock or wallboard includes a panel of gypsum and a covering of paper. To install sheetrock such that it is flat when finished, a system of mudding and taping is used over installed pieces of material that are affixed to a frame of boards (plates and studs, or joists) without leaving gaps between the pieces. The individual pieces of sheetrock or wallboard are often rectangular, and the pieces can be cut (usually scored and snapped) to create angles, or irregular shapes can be cut out of the individual pieces. The mudding process and any other smoothing typically uses joint compound, spackle, or plaster, all of which are inflexible once dried.

Plaster is installed on a backing of spaced-apart parallel wooden or metal backing pieces (lath), backer board or metal mesh. The plaster itself can be applied to the lath such that it flows or into the openings in the lath to form protrusions (keys). The keys hold the plaster to the lath once dried, while on the side opposite the keys the plaster can be smoothed to form the finished surface.

For sheetrock or plaster, therefore, the wall or ceiling finished surface is affixed to a support that is often made of wood. The wood support can shift due to changes in moisture content or temperature, for example. Other stresses can be placed upon the finished surface as well. For example, installation of a window, skylight, or other object in a wall or ceiling can result in non-uniform pressure upon different portions of the finished surface. Irregular cutouts can result in non-uniform pressures. Subsidence, water damage, and other factors can cause foundations, walls, or ceilings to shift. These non-uniform pressures and shifting of the support can cause cracking.

For drywall, cracking often occurs along a line where two panels of the material come together, and where the taping and mudding line can fracture. For plaster, often cracking is irregular in shape, as a crack forms to release non-uniform pressures. For plaster, even the insertion of a wire or screw into the finished surface can start a crack that will spread for a great distance in either direction.

In some cases, cracking is due to the regular movement of the structure that supports the finished surface. For example, in some cases a wooden frame supporting a wall rises and falls with changes in temperature. In winter, a crack may be closed up, whereas in summer, the crack may be open. Alternatively, a wooden frame swells in warm, wet conditions, and contracts in dry, cold conditions. Thus, during a dry winter a crack may open, whereas in a humid summer the crack may be closed up. Different walls interact with one another, floors, ceilings, windows, and other features that can react in various ways to changing environmental conditions. Those conditions can be cyclical each day or each year, for example. Changes in moisture levels can have as large an effect as changes in temperature, and often changes in moisture levels can have a larger effect on the underlying support structure for a wall than changes in temperature Conventional solutions typically involve filling a crack that appears with spackle, joint compound, or similar materials. But as the cyclical patterns occur that may have caused the crack in the first place, the cracks usually will reappear. Another conventional solution is to use a compressible material to fill the crack, but this can be visible when the crack closes because it can bow out from the crack. Furthermore, if the crack continues to open, the repair material can become dislodged or the additional width of the crack can become apparent. Additional conventional solutions include mesh tapes and expansible tapes, but these conventional solutions suffer from the same problems and surface imperfections can therefore reappear.

SUMMARY

A solution is needed that can cover cracks, including those that expand or contract, without dislodging or bowing as the crack changes in size. The solution should leave the wall sandable, paintable, and smooth. Embodiments described herein can be used to repair surfaces that have cracks that change in size with temperature or other factors without re-cracking. A wall patch includes at least three portions along a width. Two outer portions are adhesive, while the middle portion is elastic and pre-stretched. The outer portions can be applied to a substrate on either side of a defect such as a crack. During use, even if the crack grows or shrinks, the elastic portion can shrink or contract a corresponding amount so that the appearance of the patched area does not show reemergence of the defect.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

Figure 1:
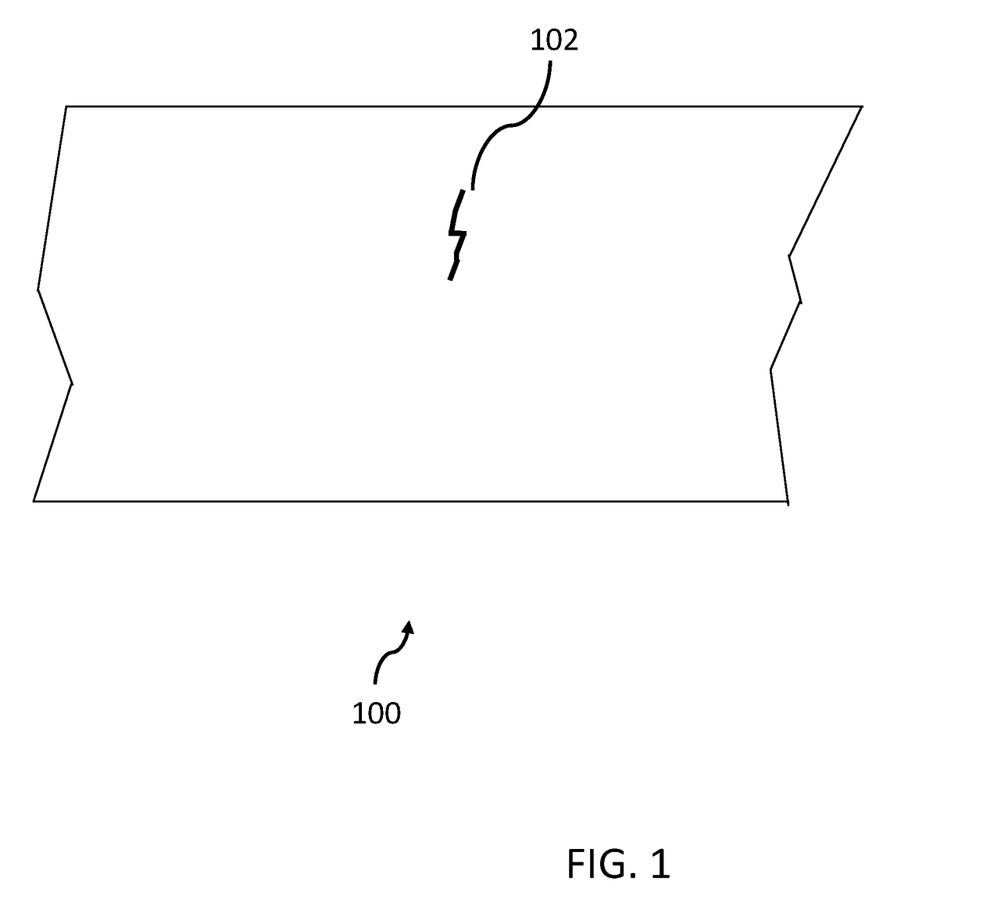
FIG. 1 is a crack in a substrate.

FIG. 1 depicts a wall 100 having a crack 102. Defects such as crack 102 can extend along a variety of surfaces, such as along joints between panels of walls, along portions of wall 100 where mechanical stress or strain is focused such as under a window or at the corner of a door, along supports such as studs or lath, or along portions of wall 100 that have some imperfection or weakness.

Removing or hiding crack 102, as described above, typically requires applying a variety of fillers, coverings, paints, or even replacement sections of wall. Each time crack 102 reopens or the patch is destroyed due to a shifting substrate or changes in humidity, the work must be redone. According to an embodiment, crack 102 can instead first be covered by a taut film or tape mimicking the texture of the surrounding wall 100. In embodiments, the film or tape can be taut such that contraction of the crack 102 to a smaller size will result in relaxation, but not deformation, of the film or tape. Accordingly the overall appearance of the film or tape remains flat, rather than warping, bowing, or wrinkling. In embodiments, the film or tape is capable of being stretched further. Thus if the crack 102 expands, the film or tape covering will stretch but will not deform, tear, or otherwise fail to maintain the same appearance as the wall 100. In embodiments, the tape or film can be paintable or sandable. In embodiments, the tape or film can be arranged in a roll form that has sufficient width and length to extend over the entire crack 102.

Figure 2A:
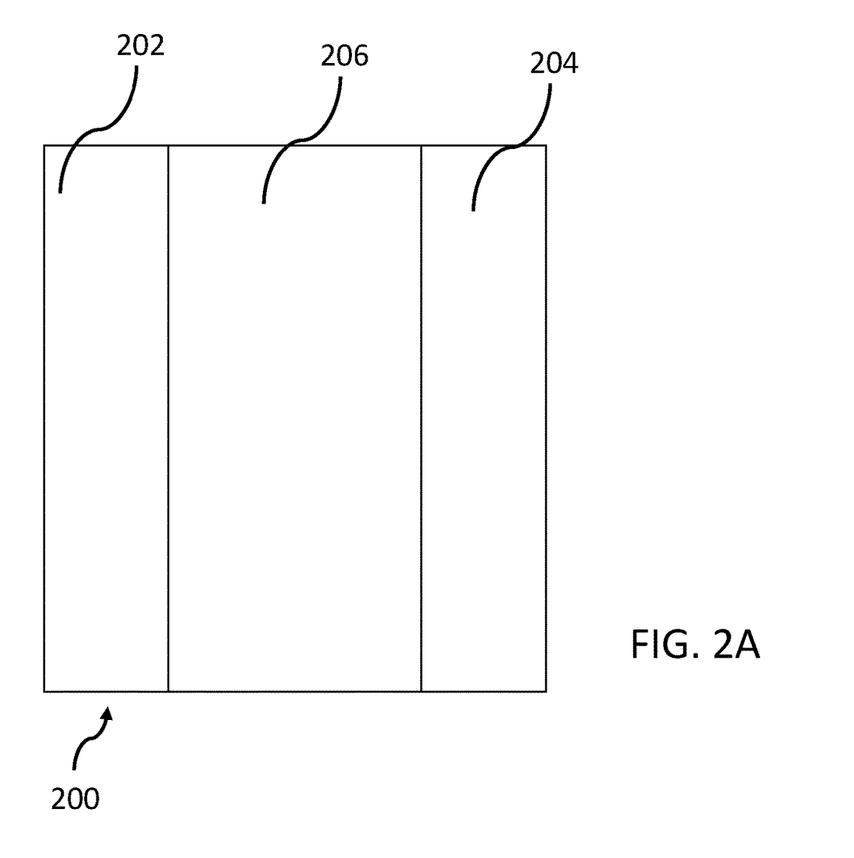
FIGS. 2A and 2B show a patch having three portions according to an embodiment.
Figure 2B:
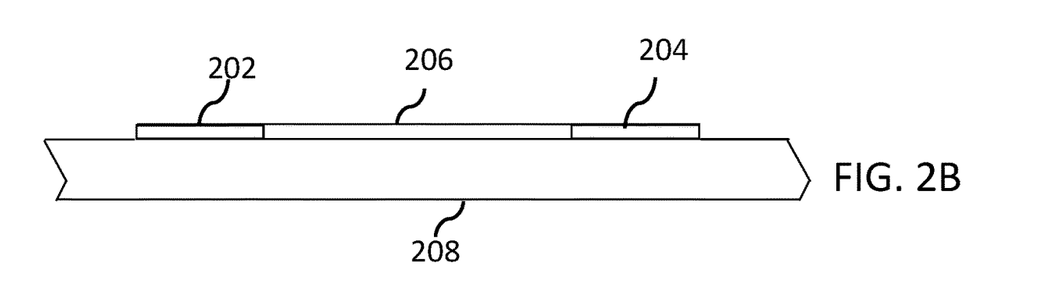

FIG. 2A is a plan view of a patch 200 according to an embodiment, and FIG. 2B is an end view of the patch 200. Patch 200 includes a first portion 202, a second portion 204, and a third portion 206. Patch 200 is an article that is configured to cover a crack. Patch 200 can have a length (top to bottom with respect to the orientation shown in FIG. 2) and width (left to right with respect to the orientation shown in FIG. 2) sufficient to cover a particular crack or other defect in a wall. In embodiments, patch 200 can have a length that is cut to size. The width of patch 200 can be a predetermined width that corresponds with a typical crack size. For example, patch 200 can have a width of 2.5 cm (1 inch), 5 cm (2 inches), or 10 cm (4 inches).

Other widths can be used based upon an expected crack size. In embodiments, the overall width of patch 200 can be determined based upon an expected crack geometry. For example, in one embodiment, patch 200 is designed for use with a long, narrow crack present at the interface between two adjacent panels of sheetrock or other rectangular segments. In that embodiment, the width of patch 200 can be relatively small. In other embodiments, patch 200 can be designed for use with a meandering or irregular crack, such as a crack that is not at the junction of two straight panels, or a crack in a plaster wall. In that embodiment, the width of patch 200 can be relatively large. A typical crack caused by expansion and contraction of an underlying structure can have a width of between about 1/16 inch and about 1/8 inch, and therefore one width of patch 200 can be about 1/8 inch or more, more preferably about inch or more. Larger cracks commonly found in drywall can have a width of between about 1/4 inch and about 1/2 inch, and therefore another width of patch 200 can be about 1/2 inch or more, or more preferably 1 inch or more.

First portion 202 and second portion 204 can be adhesive, such as an adherent or adherable to a substrate. The manner in which first portion 202 and third portion 206 adhere to adjacent components can be, for example, a coating of pressure-sensitive adhesive, a curable adhesive (e.g., using heat, light, or a curing agent), or a separately applied adhesive composition. The adhesive could be affixed to a substrate such as a mesh, plastic extrusion, foil, or paper backing. In another embodiment, first portion 202 and second portion 204 can be, or can be adhered by, a wet layer of plaster, thin-set, spackle, or other materials that can be used to attach to a wall. In embodiments, the third portion 206 can heat-shrink after the plaster has set. In some embodiments (described in more detail below) a liner or other protective layer can be used to maintain the adhesive properties of first portion 202 and second portion 204. First portion 202 and second portion 204 can be made of a variety of materials that will adhere to a variety of substrates, such as new sheetrock, previously-painted sheetrock, plaster, or cementboard, for example.

Throughout this application, the terms "liner" and "structural support" are used to describe system components. As used throughout this application, a "liner" is a layer or film that exhibits adhesion (viz., minimal adhesion) with the material that forms a patch or portion thereof. Examples of liners can include coated polymeric films, mesh tape, or paper tape. The terms "structural support" or "lattice" are used interchangeably to refer to a material that exhibits limited adhesion, and which also holds the patch in a fixed position and with a desired level of tension. Some liners can also be structural, and are referred to herein as structural liners. That is, a structural support (unlike a liner) can hold a patch in a stretched position without buckling, curving, or otherwise deforming.

In various embodiments, a patch can exhibit adhesive properties on both sides, as a "double stick" configuration. Thus, first portion 202 and second portion 204 can be made of a material with adhesive properties, interconnected by third portion 206 with elastomeric properties, and the patch 200 can effectively be used with either side facing the wall when applied. In some such embodiments, such as where the elastomeric third portion 206 is pre-tensioned, it may be beneficial to apply a liner to one side, and a structural support to the other. Then, to apply patch 200 to a wall or other substrate, the liner can be removed first, exposing a wall side thereof. Once the wall side is affixed to a substrate, such that the first portion 202 and second portion 204 are adhered to the substrate, the structural support can be removed, which allows expansion and contraction of the pre-tensioned elastic third portion 206.

In use, the patches described herein can be applied to a wall surface in such a way that they are not visible. In one embodiment, first portion 202 and second portion 204 are adhesive-backed paper tapes and third portion 206 is butyl rubber, such that in use the patch 200 can be applied to a wall and the wall can be mudded around each of the paper tape portions. By feathering in the paper tape of 202 and 204, the overall patch 200 is a smooth surface in the wall, and once painted the patch 200 is not easily detected.

In embodiments, first portion 202 and second portion 204 can be lined with a liner such as a paper tape (not shown). The paper can be removed before application of the system 200 to a crack or other portion of a wall. Alternatively, the paper can be a part of first portion 202 and second portion 204 and remain on the finished patch. In embodiments, the thickness of first portion 202 and second portion 204 can be about the same as a single layer of joint compound. For new construction, the patched area can then have two layers of joint compound rather than three layers as are conventionally applied to a junction between pieces of drywall. In embodiments, the outer edges of first portion 202 and second portion 204 (viz., the parts furthest from third portion 206) are tapered to be thinner than the inner edges of first portion 202 and second portion 204 (viz., the parts closest to third portion 206).

Third portion 206 can be made of an expansible, shrinkable, or elastic material, interposed between first portion 202 and second portion 204. The elasticity of the material that makes up third portion 206 allows patch 200 to adapt to changing crack sizes or shapes. In use, third portion 206 can be arranged over a crack such that when the crack expands, third portion 206 becomes wider. Contrariwise, if the underlying crack contracts, third portion 206 (which preferably retains sufficient elastic tension) can contract a corresponding amount such that the overall surface of patch 200 remains smooth.

In embodiments, third portion 206 is pre-tensioned before application to a crack. In such embodiments, patch 200 need not be applied when a crack is at its absolute smallest size. Based upon the elasticity of patch 200, including third portion 206, the overall width of patch 200 can become smaller or larger over time without destroying patch 200, or creating undesirable wrinkles, bubbles, or similar blemishes on an underlying wall.

Thus, in one practical application, patch 200 can be applied to a wall such that first portion 202 adheres to one part of the wall and second portion 204 adheres to another part of a wall, and the first portion 202 and second portion 204 are adhered to parts that are opposite a crack from one another. Third portion 206 covers the crack, so that the crack is no longer apparent. Over time, even if the crack grows, shrinks, or otherwise changes shape or size, patch 200 can still appear smooth as third portion 206 stretches or relaxes in order to maintain coverage.

Patch 200 can also be used to cover cracks that result from wall segments that are not flush. For example, two panels in a common wall segment can move relative to one another in such a way that the wall is no longer flat (rather than having a crack or gap as described above). Patch 200 can be applied with first portion 202 on one of the wall panels, second portion 204 on a second of the wall panels, and third portion 206 bridging that gap. Movement of the wall panels may cause a bump, depression, or discontinuous surface at their junction. Patch 200 can hide the cracked paint, wall tape, or mud at that junction and at least partially smooth that junction.

Depending on the embodiment, third portion 206 can be made of any of a variety of materials including latex, nitrile, acrylic, silicone, rubber, vinyl, or butyl rubber, among other flexible elastic materials. A preferred embodiment is made from butyl rubber, though other materials such as elastomeric caulk, latex, or urethane could used in embodiments. Materials for third portion 206 can be selected based upon an expected amount of expansion or contraction. For example, an elastic material can be used that is capable of stretching 10%, 20%, or even 100% without breaking or delaminating. Patches 200 including a third portion 206 that stretches between 0% and 100% can be painted with a traditional paint that has some elasticity, such as a latex paint. In embodiments, the materials that make up each of the first portion 202, the second portion 204, and the third portion 206 are selected such that they are paintable with a variety of paints. The third portion 206 can have a similar elasticity as the paint applied thereto.

Painting can be performed when the third portion 206 is in a loose, pre-stretched state, in embodiments. Alternatively, painting can be performed after the third portion is pre-tensioned on a structural support. In some embodiments, paint (or even a primer) could be selected that is sufficiently elastomeric in nature such that expansion or contraction of the underlying third portion 206 does not result in cracking or delamination (when stretched) or puckering (when shrunk).

Likewise, the adhesive first and second portions (202 and 204) can have a surface texture that is similar to a surface texture of the elastic third portion 206 that is arranged therebetween. For example, each of the first, second, and third portions (202, 204, and 206) can have a smooth finish, or each of the first, second, and third portions (202, 204, and 206) can have a texture that matches a common wall texture, such as a spatter, knock-down, or sand finish. In embodiments, acrylic patterning can be added to a smoothed wall after patch 200 has been applied.

Figure 3:
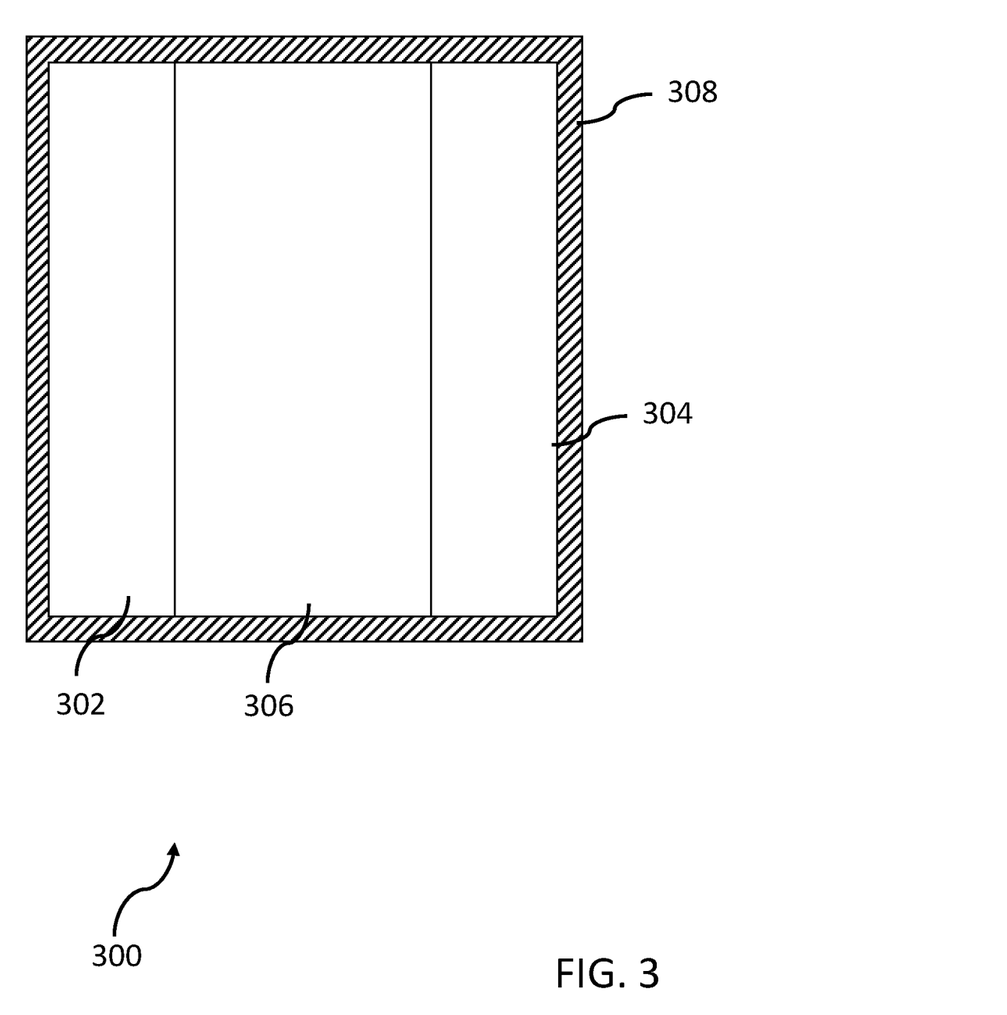
FIG. 3 is a patch having three portions arranged on a liner, according to an embodiment.

FIG. 3 is a plan view of a system 300 including first portion 302, second portion 304, and third portion 306, each of which is substantially similar to its counterpart referred to by the same name in FIG. 2. In embodiments, structural liner 308 is used to hold the remainder of system 300 in a pre-stretched position. Liner 308 also protects at least one side of the adhesive properties of first portion 302 and second portion 304. In embodiments, there can be a liner on both sides of the patch portion, as described in more detail below. Alternatively, structural liner 308 can have a release coating on both sides, such that first portion 302 and third portion 306 easily release from structural liner 308 and also the system 300 can be rolled up so that first portion 302 and third portion 306 are kept in contact with the opposite side of structural liner 308 until use. In embodiments, liner 308 can have sufficient structural integrity such that third portion 306 can be pre-stretched and held under tension on liner 308. First portion 302 and second portion 304 can be removably adhered to liner 308, such that third portion 306 is expanded 10%, 20%, or even up to 100% from its relaxed width.

System 300 can be applied to a substrate that includes a crack or other defect, or even a location where a it appears likely that a defect will occur in the future such as a recently-patched area. In one example, the substrate can be a wall and the defect can be a crack. The first portion 302 and second portion 304 are adhered to the wall on opposite sides of the crack. Adhesion can be promoted by pressing first portion 302 and second portion 304 against the wall to promote wetting out. To reduce the incidence of bubbles, wrinkles, or similar features, a roller can be used to apply the first portion 302 and the second portion 304 to the wall.

Once first portion 302 and second portion 304 are adhered to the wall, the third portion 306, which is under tension, will cover the crack (or at least a portion of the crack). Liner 308 can then be removed from the non-wall-facing side of system 300. After application, expansion or contraction of the crack can cause a corresponding expansion or contraction of third portion 306, which will nonetheless present a smooth, finished surface.

In embodiments, third portion 306 can be capable of more than 100% elongation. Third portion 306 could even be capable of very large amounts of elongation, for example by employing an elastomeric film or similar substance as third portion 306. In those embodiments, third portion 306 could be capable of elongation on the order of 100% or more. In conjunction with a third portion 306 that is made of such a highly elastic substance, a relatively more elastic paint or similar coating may be preferable. Some latex and acrylic paints are capable of stretching elastically by 5-10%. Additionally, elastomeric paints are available that can stretch by much greater percentages and still recover their original size when tension is removed.

Coupling system 300 with a paint having a higher stretchability or elasticity facilitates use of a more stretchable or elastic third portion 306 without causing delamination. A more stretchable or elastic third portion 306 can cover a wider crack or other defect, can accommodate a greater seasonal variation in the size of the underlying defect, or a smaller third portion 306 can be used while still providing adequate coverage of the defect. In some embodiments, these modifications can be combined with one another.

In embodiments, a crack or opening that increases and decreases in size over time, such as seasonally, can be pre-filled prior to application of system 300. For example, where a crack opens between two panels in a sheetrock wall, the crack can first be filled using a traditional spackle, caulk, or other appropriate filling material, then system 300 can be applied over the filled crack. The filling material can prevent some contraction of the crack from its size at the time when it is covered by system 300.

Figure 4A:
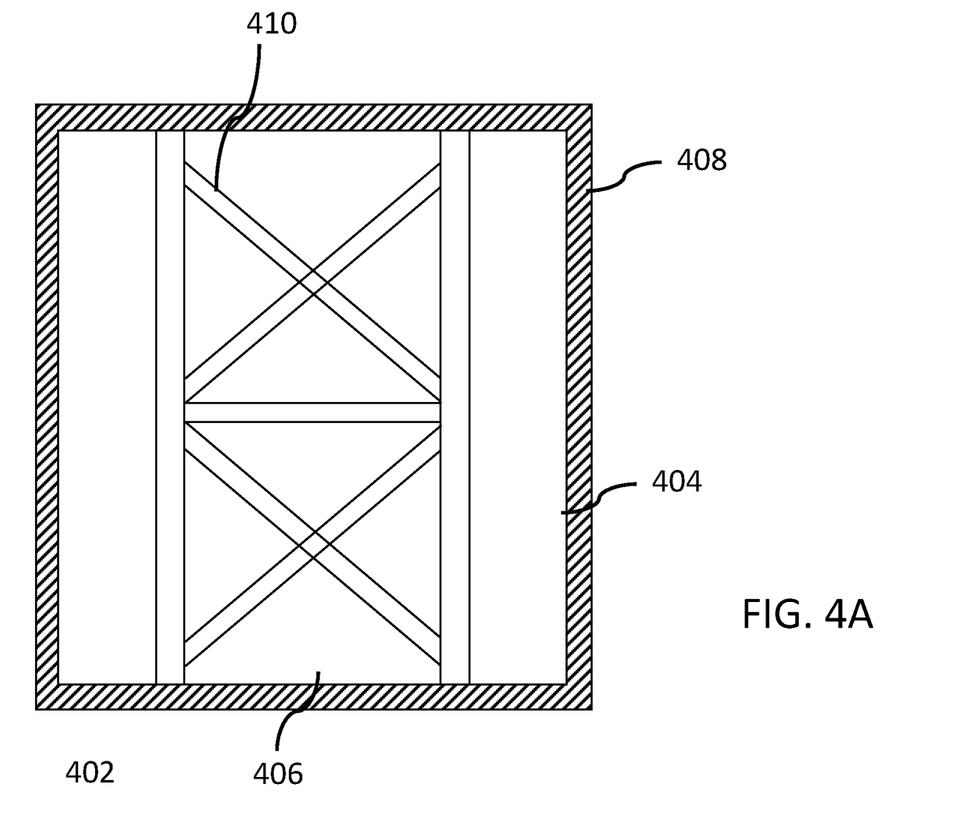
FIGS. 4A and 4B show a patch having three portions arranged on a liner with a lattice, according to an embodiment.
Figure 4B:
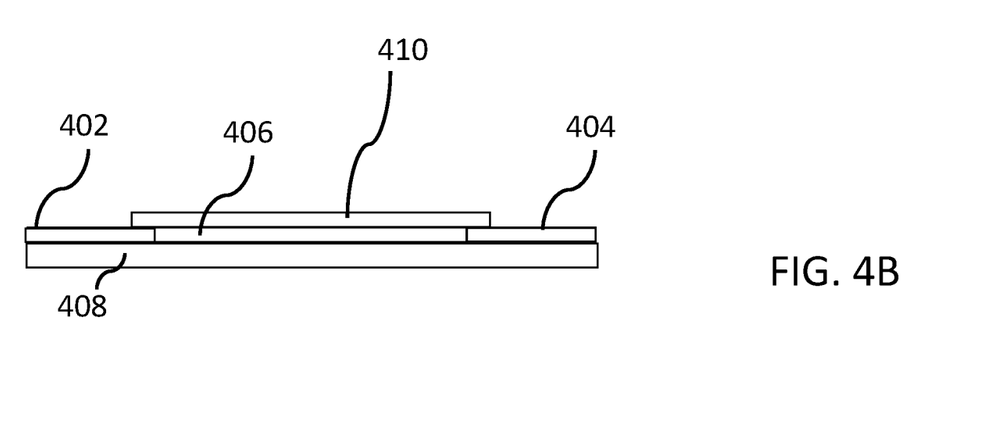

FIG. 4A depicts a system 400 including first portion 402 that has adhesive properties, a second portion 404 that has adhesive properties, and a third portion 406 that has elastic properties, all arranged on a liner 408. FIG. 4B is an end view of system 400. In the embodiment shown in FIG. 4, a lattice 410 is applied to engage with each of the first portion 402 and second portion 404, while providing structural support to tension third portion 406 until applied to a wall or other substrate. In the embodiment shown in FIG. 4, lattice 410 can be arranged adjacent liner 408.

Lattice 410 has the structural integrity to maintain tension on third portion 406. Therefore, unlike the liners described above with respect to other embodiments, liner 408 need not have the structural integrity on its own to support the tension in third portion 406.

In alternative embodiments, various other shapes of lattice 410 can be used. Lattice 410 or other lattices can be made of a material coated in a release material so that liner 410 can easily be removed from first portion 402 and second portion 404 during application. In embodiments where patch 400 is a roll, such as the roll 600 shown in FIG. 6, lattice 410 can have a repeating pattern to provide support along the entire length of the roll.

Figure 5A:
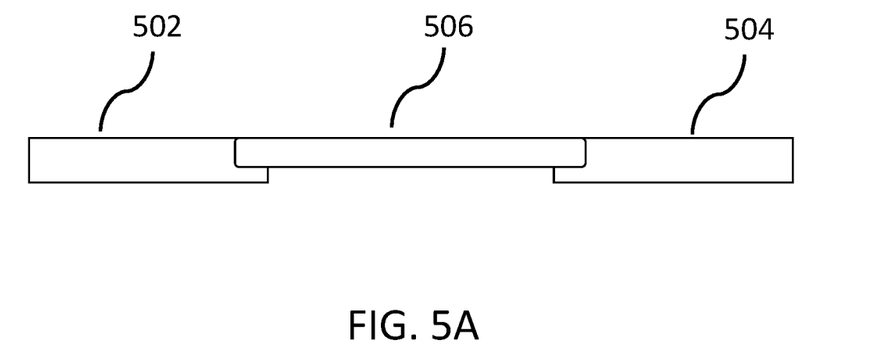
FIGS. 5A-5C depict a patch or roll in a prestretched state (FIG. 5A), a contracted state (FIG. 5B), and a stretched state (FIG. 5C).
Figure 5B:
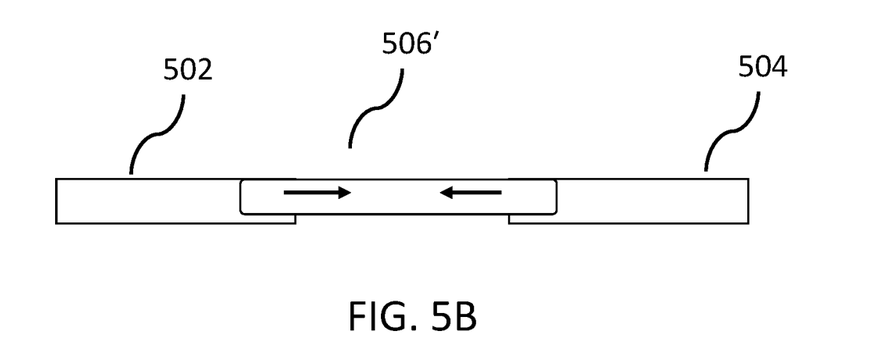
Figure 5C:
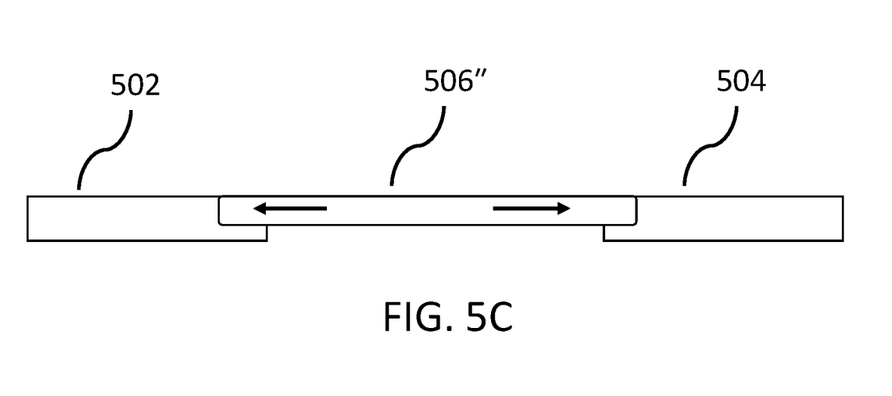

FIGS. 5A-5C show a patch 500 according to an embodiment. Patch 500 includes first portion 502, second portion 504, and third portion 506, each of which is similar to its counterparts having similar reference numerals (iterated by 100) in the other embodiments described above.

As shown in FIG. 5A, patch 500 is in a pre-stretched state that is ready for application to a wall or other substrate. In FIG. 5B, the same patch 500 is shown in a contracted state. In the contracted state depicted in FIG. 5B, third portion 506' is narrower because it has contracted with the decreased distance between first portion 502 and second portion 504. In the stretched state depicted in FIG. 5C, third portion 506" has been stretched beyond even its original prestretched condition (shown in FIG. 5A). The arrows in FIGS. 5B and 5C show the contraction and expansion, respectively, of the third portion 506 in those two drawings from their original, partially prestretched state.

Figure 6:
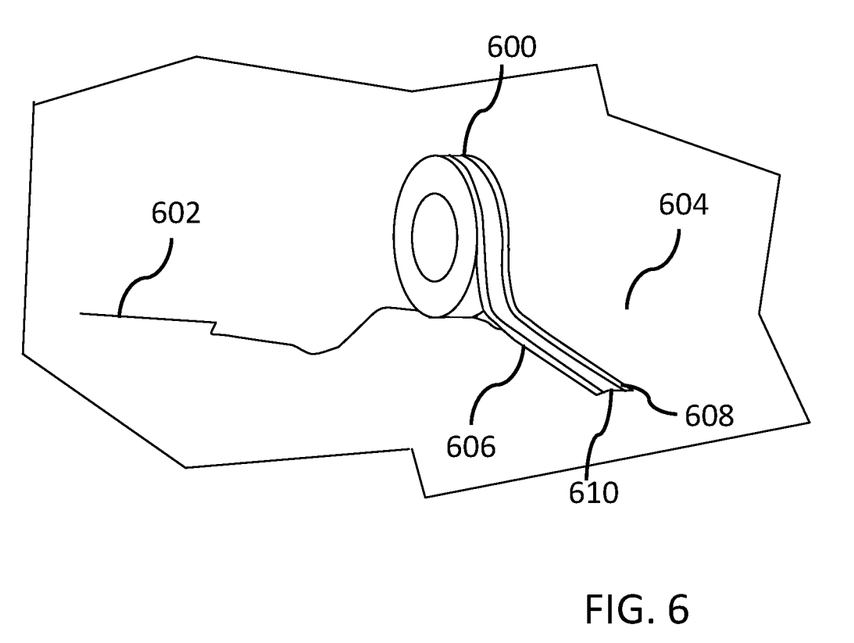
FIG. 6 shows a roll of patch being applied to a crack.

In an embodiment, patch 500 can be prepared by first generating the elastomeric material and keeping it in a loose or unstretched state. While in this state, the elastomeric material (e.g., third portion 506') can be painted. The painted third portion 506' can then be stretched and applied to a structural support so that it can be applied to a wall or other surface in the pre-stretched state. Accordingly, as the elastomeric material relaxes there will be reduced potential for puckering that could be caused by painting the elastomeric material in a pretensioned state. FIG. 6 is a perspective view of a roll 600 of patch material that is applied to a crack 602 in a substrate 604. As shown in FIG. 6, crack 602 has multiple sections, and can require multiple sections of roll 600 to fully cover. Roll 600 can be cut to size for each of the zigs and zags of a given crack. As shown in FIG. 6, roll 600 includes first portion 606 that has adhesive properties, second portion 608 that has adhesive properties, and third portion 610 that has elastic properties, as described with respect to the other embodiments above.

In embodiments, after the roll 600 is applied cut to size, joint compound or similar material can be applied over the tape, and the resulting structure can be sanded until it is flush with the remainder of the substrate 604.

Figure 7:
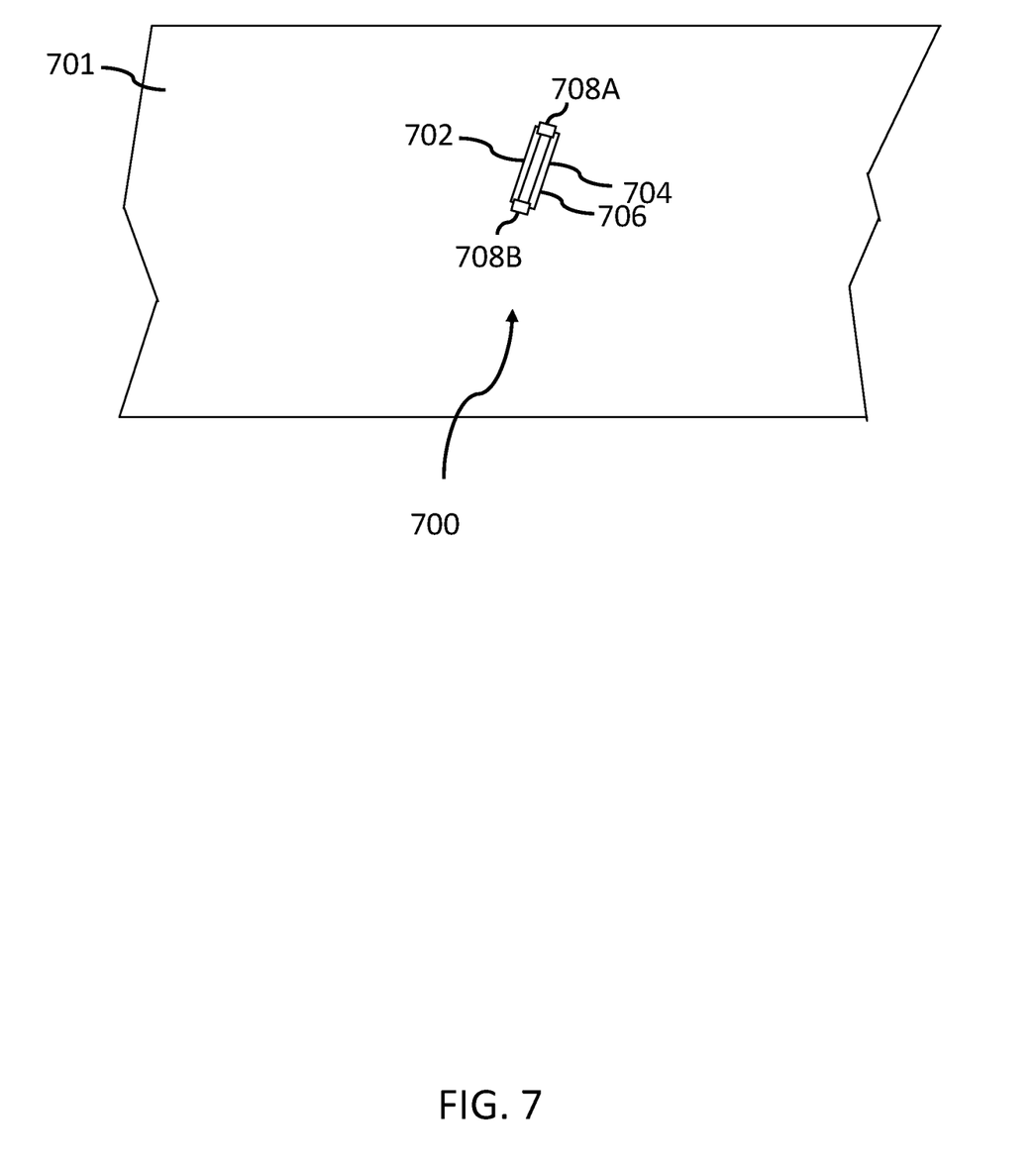
FIG. 7 shows a patch applied to a wall, according to an embodiment.

FIG. 7 shows a patch 700 applied to a wall 701. Patch 700 includes a first portion 702 and second portion 704 that are adhesive-backed paper tapes and third, expansible portion 706 that is butyl rubber. Patch 700 is applied to wall 701, and wall 701 can be mudded around each of the paper tape portions 702 and 704. By feathering in the paper tape of 702 and 704, the overall patch 700 can be smoothed to the overall surface of the wall 701, and once painted the patch 700 is not easily detected.

However, because the patch 700 is taken from an elongate roll of material such as roll 600 previously described with respect to FIG. 6, at the cut ends there will be a portion of expansible portion 706 that is not connected to wall 701 by paper tape. In order to form a smooth, non-obvious connection between the exposed edge of expansible portion 706 and wall 701, first supplemental piece 708A and second supplemental piece 708B are attached thereto in order to form an edge that can be feathered in to the wall. In FIG. 7, the supplemental pieces 708A and 708B are shown extending over the expansible portion 706, and it should be understood that in alternative embodiments the supplemental pieces 708A and 708B could be tucked under the expansible portion 706, or affixed to the expansible portion 706 by adhesive or other fastening mechanisms.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

I claim:

1. A patch comprising:
a first portion having adhesive properties,
a second portion having adhesive properties, and
a third portion that is elastic and conformable, wherein the third portion is interposed between the first portion and the second portion and is held in a pre-stretched state by a structural liner that is removably adhered to the first portion and the second portion.

2. The patch of claim 1, wherein the third portion is made of a butyl rubber.

3. The patch of claim 1, wherein the patch further comprises a second liner arranged on the first portion and the second portion, and wherein the second liner is arranged opposite the first and second portions from the structural liner.

4. The patch of claim 3, wherein the liner is selected from the group consisting of a paper tape, a mesh tape, or a coated plastic film.

5. The patch of claim 3, wherein the structural support is a lattice.

6. A system comprising:
a first patch portion having adhesive properties,
a second patch portion having adhesive properties,
a third patch portion that is elastic and conformable, wherein the third portion is interposed between the first patch portion and the second patch portion, and
a structural liner removably adhered to the first patch portion and the second patch portion and configured to hold the third patch portion such that the third patch portion is under tension, and such that removal of the structural liner allows expansion and contraction of the pre-tensioned elastic third portion.

7. The system of claim 6, wherein the first patch portion, the second patch portion, and the third patch portion are made from a material that are compatible with a paint having a similar elasticity as the third portion.

8. The system of claim 6, wherein the first patch portion and the second patch portion are separated from one another by at least 6.35 mm (0.25 inches) whilst the third patch portion is under tension.

9. The system of claim 6, wherein the third patch portion is made from a butyl rubber.

10. The system of claim 6, further comprising a release liner arranged on the first patch portion and the second portion and opposite from the structural liner.

11. The system of claim 10, wherein the release liner is selected from the group consisting of a paper tape, a mesh tape, or a coated plastic film.

12. The system of claim 6, wherein the structural liner is a lattice.

13. A method comprising:
removing a liner from a patch system, the patch system having:
a first patch portion having adhesive properties,
a second patch portion having adhesive properties,
a third patch portion that is elastic and conformable, wherein the third portion is interposed between the first patch portion and the second patch portion,
the liner, and
a structural liner coupled to the first patch portion and the second patch portion and configured to hold the third patch portion such that the third patch portion is under tension;
adhering the first patch portion and the second patch portion to a surface; and
removing the structural support from the first patch portion and the second patch portion.

14. The method of claim 13, further comprising applying joint compound across the first patch portion and the second patch portion.

15. The method of claim 14, further comprising smoothing the joint compound such that the surface, the joint compound, and the third patch portion form a smooth continuous surface.

16. The method of claim 13, further comprising painting the patch system while the patch system is under tension.

17. The method of claim 13, wherein the third patch portion comprises butyl rubber.

18. The method of claim 13, the first patch portion and the second patch portion are separated from one another by at least 6.35 mm (0.25 inches) whilst the third patch portion is under tension.

* * * * *